United States Patent
Sølund

[11] Patent Number: 4,805,780
[45] Date of Patent: Feb. 21, 1989

[54] SORTING MACHINE, IN PARTICLAR FOR SMALL PARCELS

[75] Inventor: Jørgen Sølund, Tappernøje, Denmark

[73] Assignee: ITS-Intern Transport System A/S, Tappernøje, Denmark

[21] Appl. No.: 41,136

[22] PCT Filed: Aug. 25, 1986

[86] PCT No.: PCT/DK86/00094
§ 371 Date: Apr. 14, 1987
§ 102(e) Date: Apr. 14, 1987

[87] PCT Pub. No.: WO87/01311
PCT Pub. Date: Mar. 12, 1987

[30] Foreign Application Priority Data

Aug. 26, 1985 [DK] Denmark .................. 3864/85

[51] Int. Cl.⁴ ............................... B07C 3/08
[52] U.S. Cl. ......................... 209/698; 198/370; 198/706; 198/714
[58] Field of Search ............ 209/698, 900, 903, 912, 209/933, 941; 198/370, 465.4, 680, 703, 706, 714

[56] References Cited

U.S. PATENT DOCUMENTS

| 3,055,486 | 9/1962 | Meyer | 198/706 |
| 3,088,629 | 5/1963 | Seymour | 198/706 |
| 3,401,796 | 9/1968 | Hagiz | 209/698 |
| 3,750,860 | 8/1973 | Jaffre | 198/706 |
| 4,509,635 | 4/1985 | Emsley et al. | 209/698 |

FOREIGN PATENT DOCUMENTS

| 0099434 | 2/1984 | European Pat. Off. | |
| 422755 | 12/1925 | Fed. Rep. of Germany | 198/706 |
| 2546748 | 4/1977 | Fed. Rep. of Germany | |
| 0095029 | 6/1983 | Japan | 198/706 |

Primary Examiner—Johnny D. Cherry
Assistant Examiner—Donald T. Hajec
Attorney, Agent, or Firm—Browdy & Neimark

[57] ABSTRACT

A sorting machine with trays which are moved in an endless path extending in a vertical plane in such a manner that the trays face upwardly both in the lower and upper run of the path, the trays being pivotally suspended between two synchronously driven conveyors. Also provided are a plurality of stationary chutes between one run of the path or both of the runs, and selectively controllable, pivotable levers are provided for each chute, which are caused, in an activated state, to engage a passing tray which is thereby pivoted so as to deposit its contents onto a predetermined one of the chutes. At least one side of each tray carries at least two wheels which are placed above and below the pivot axis, respectively, in the tray equilibrium position, so that each tray can actually emptied forwardly or rearwardly with respect to the direction of motion, the direction of emptying depending upon whether it is the upper or the lower wheel which is caused to engage and activated lever.

2 Claims, 2 Drawing Sheets

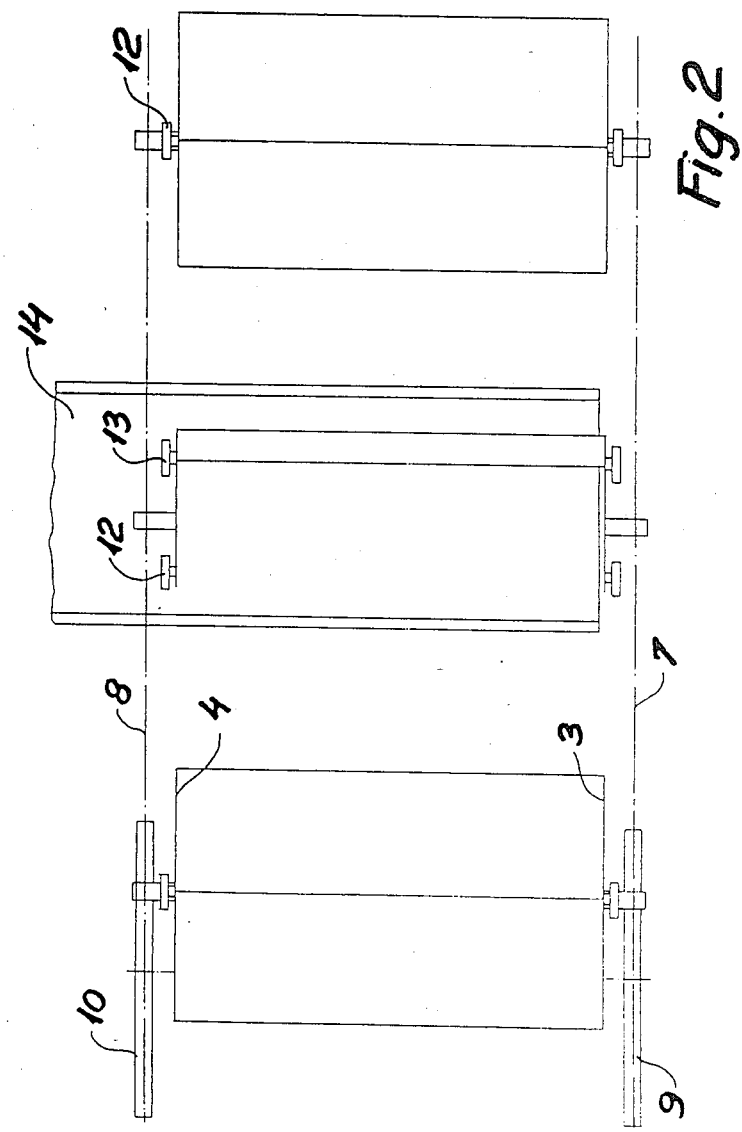

SORTING MACHINE, IN PARTICLAR FOR SMALL PARCELS

BACKGROUND OF THE INVENTION

1. The Field of the Invention

The invention concerns a sorting machine of the type having trays which are moved in an endless path extending in a vertical plane in such a manner that the trays face upwardly both in the upper and the lower run of the path, the trays being pivotally suspended between two synchronously driven conveyors, a plurality of stationary unloading means being provided below the upper and/or lower run of the path and for each receiving means a selectively controllable activation means which is adapted, in its activated state, to be caused to engage a passing tray so that the tray is pivoted for emptying the contents onto the associated receiving means.

2. The Prior Art

The DE-AS No. 25 46 748 discloses a bucket elevator or conveyor which is constructed in the same manner as is stated above, although it is intended for bulk goods and not individual articles, such as small parcels and the like.

U.S. Pat. No. 3 055 486 discloses a bucket conveyor of a similar type for transport of bulk goods from a supply station to one of a plurality of unloading stations.

SUMMARY OF THE INVENTION

The object of the invention is to provide a sorting machine of the type stated in the opening paragraph, which requires little space and has a great sorting capacity, while the activation means used and their cooperation with the individual trays during emptying are simpler than in the first-mentioned prior art, and which enables the individual trays during emptying to be optionally pivoted with the opening in a forward direction (headwind) and in a rearward direction (tail wind).

This object is achieved according to the invention in that the sorting machine stated in the opening paragraph in which at least one side of each tray carries two wheels which are placed above and below the pivot axis of the tray, respectively, in the tray equilibrium position, and which are adapted to be caused to engage an activation means disposed above and below the pivot axis of the tray, respectively, and consisting of a lever which is mounted for pivotal movement about a horizontal shaft in the sorting machine.

BRIEF DESCRIPTION OF THE DRAWINGS

The invention will be described more fully below with reference to the drawing, in which:

FIG. 2 is a top view, on a larger scale, of the same end of the sorting machine of the invention.

DETAILED DESCRIPTION OF THE PREFERRED EMBODIMENT

Figure 1:
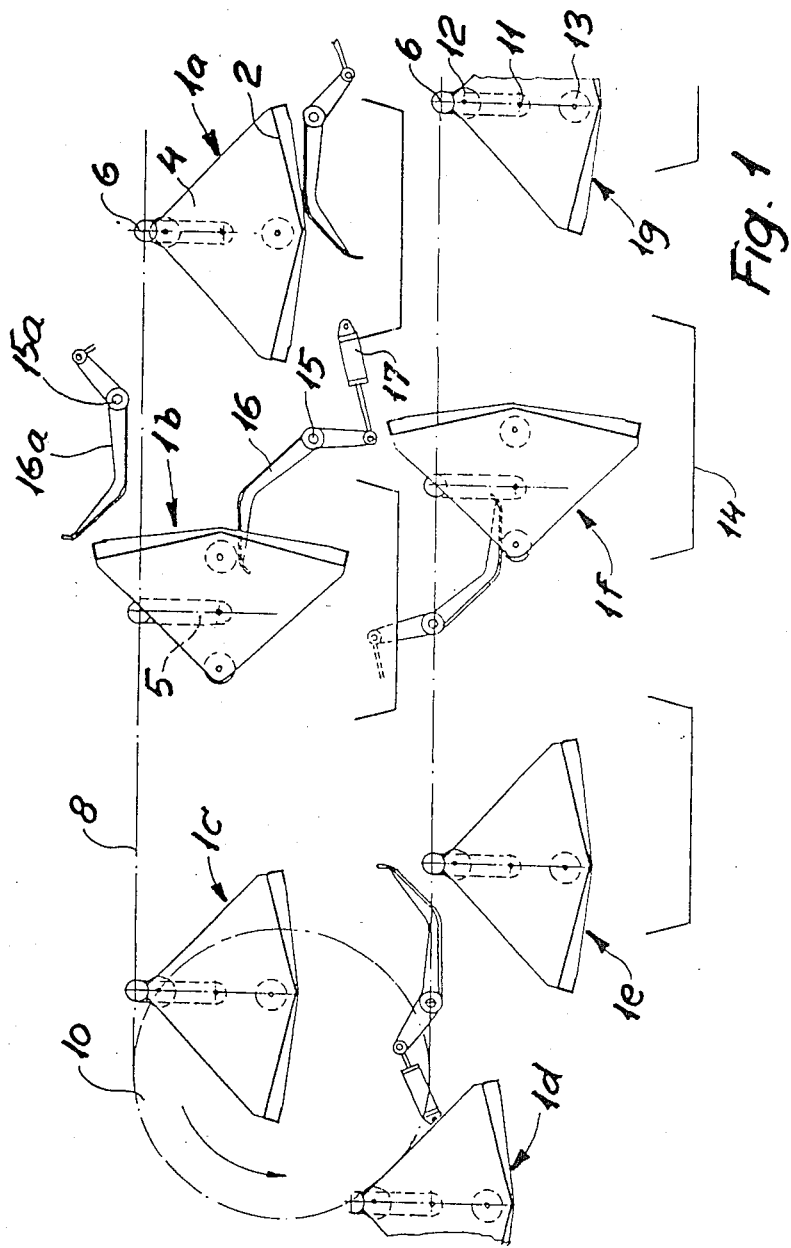
FIG. 1 is a lateral view of one end of a sorting machine according to the invention.

The sorting machine shown in the drawings contains a plurality of trays, 1a, 1b, 1c, 1d, 1e, 1g . . . preferably of aluminium and with a V-shaped bottom 2 and side members 3 and 4. These trays are at both sides pivotally suspended from arms 5 which are secured at the top, at 6, to their respective ones of chains 7 and 8 driven in synchronism and by the same drive motor (not shown), these chains being indicated in the drawing in broken lines. The chains 7 and 8 preferably consist of steel wires placed around a chain wheel at each end of the sorting machine.

Since only one end of the sorting machine is shown in the drawing, only one chain wheel 9 and 10 is visible for each steel wire 7 and 8, respectively.

As mentioned, the trays are pivotally suspended from arms 5. The suspension point 11 of the trays is disposed above the centre of gravity of the trays, so that their V-shaped bottom 2 usually assumes a horizontal position.

Projections in the form of wheels 12 and 13, respectively, are secured above and below the suspension point 11 on the external side member 4.

Below the trays on both the upper and the lower run of the path, a plurality of stationary chutes 14 is placed at even intervals in a machine frame (not shown), in which a corresponding number of levers 16 is secured, these levers being pivotable about a horizontal shaft 15.

The levers 16 can be caused to assume an activated state by means of their respective pneumatic cylinders 17, during which the levers 16 associated with the upper path run are caused to engage the lower wheel 13 on each passing tray, as shown e.g. at the tray 1b in FIG. 1, and during which the levers 16 associated with the lower path run are caused to engage the upper wheel 12 on each passing tray, as shown e.g. at the tray 1f in FIG. 1. Consequently, the trays 1b and 1f in question are pivoted to empty their contents onto the chutes 14 disposed below.

Further, in an additional embodiment of the invention, a plurality of levers 16a (only one is visible in the drawing) is provided, these levers 16a being pivotable about a horizontal shaft 15a and, seen in a vertical direction, disposed at the opposite side of the pivot axis 11 of the tray with respect to the first-mentioned levers 16, so that the trays can optionally be emptied both in the upper and the lower run of the path at one or the other side, depending upon whether a lever 16 or a lever 16a is activated and engages one or the other of the wheels 12 and 13.

When the levers 16 or 16a are not activated, the trays just pass unaffected, as shown in respect of the other trays 1a, 1e and 1g.

Feeding to the conveyor is effected from a feeding unit (not shown), which may be placed in any desired stationary position above the upper or lower run of the path, and the contents of the trays are automatically controlled for emptying into a chute 14 determined by an identification code on each parcel.

Activation means and projections may be arranged at both sides of the trays so that the trays are hit by activation means simultaneously at each side.

I claim:

1. In a sorting machine, in particular for small parcels, with trays which are moved in an endless path including an upper and a lower run extending in a vertical plane in such a manner that carrying surfaces of the trays are disposed in a substantially vertical plane such that the trays face upwardly both in the upper and lower run of the path, the trays being pivotally suspended about a pivot axis between two synchronously driven conveyors, a plurality of stationary receiving means being provided below at least one of the upper and lower runs of the path and for each receiving means a selectively controllable activation means operable in an activated state to engage a passing tray so that said tray is pivoted for emptying contents onto the associated receiving means, the improvement comprising:
  two wheels carried by at least one side of each tray placed above and below the pivot axis of the tray, respectively, in a tray equilibrium position; and
  a first activation means disposed above and below the pivot axis of the tray for engagement with one of said two wheels, said first activation means consisting of a lever which is mounted for pivotal movement about a horizontal shaft in the sorting machine.

2. In a sorting machine according to claim 1, the improvement further comprising a second selectively controllable activation means provided for each stationary receiving means, said second activation means consisting of a lever mounted for pivotal movement about a horizontal shaft in the sorting machine, said second activation means being disposed at an opposite side of the pivot axis of the tray with respect to the first activation means.

* * * * *